United States Patent [11] 3,632,198

[72] Inventor Nathan D. Puffer
 Maplewood, Minn.
[21] Appl. No. 17,453
[22] Filed Mar. 9, 1970
[45] Patented Jan. 4, 1972
[73] Assignee Minnesota Mining and Manufacturing Company
 St. Paul, Minn.

[54] TRANSPARENCY PROJECTOR
 7 Claims, 3 Drawing Figs.

[52] U.S. Cl. .................................................. 353/60
[51] Int. Cl. ...................................................... G03b 21/16
[50] Field of Search ............................................. 353/57–61, 95

[56] References Cited
UNITED STATES PATENTS
3,267,801 8/1966 Abbott ......................... 353/60
1,966,531 7/1934 Tint ............................. 353/61

Primary Examiner—Leonard Forman
Assistant Examiner—A. J. Mirabito
Attorney—Kinney, Alexander, Sell, Steldt & Delahunt ABSTRACT: A transparency projector in which the housing is formed with an airflow passageway therethrough and a normally horizontal transparency support deck above the airflow passageway. The deck is formed with a projection aperture through which light is directed from within the housing to project the image contained on a transparency positioned over the projection aperture and a fan is supported within the housing to project the image contained on a transparency positioned over the projection aperture and a fan is supported within the housing to move air through the airflow passageway. The moving air is directed by walls positioned in the airflow passageway through a venturi-type path with its throat between a first lens and the projection aperture to create a partial vacuum below the projection aperture when a transparency is over it to locate and cool the transparency during projection thereof.

PATENTED JAN 4 1972　　　　　　　　　　　　　　　　　　3,632,198

INVENTOR.
NATHAN D. PUFFER
BY Kinney, Alexander,
Sell, Steldt & DeLa Hunt
ATTORNEYS

TRANSPARENCY PROJECTOR

This invention relates to a transparency projector and in one aspect to a novel small format overhead projection in which a flow of air is directed to cool a transparency and to locate and maintain the transparency at the focal plane during projection thereof.

The prior art is replete with transparency projectors utilizing one or more fans to cool the projection lamp and lenses and also to directly cool the transparency. One persistent problem with transparency projectors has been maintaining the projected image in focus as the transparency is heated. During projection the transparency has a tendency to bulge, known in the art as "heat popping," thereby changing its position relative to the projection lenses which necessitates refocusing of the projected image. This problem is especially severe with still projectors such as slide projectors since the image contained on the transparency may be projected for an extended period of time. To eliminate this problem some prior art transparency projectors have held the transparency between a pair of glass plates. This has not been a totally acceptable solution however since some means must be provided to dissipate heat from the glass plates to prevent damage to the transparency, it is inconvenient to place the transparency between the glass plates and the glass plates accumulate dirt and foreign matter which distort the projected image. U.S. Pat. No. 3,273,953 discloses a projector which eliminates the glass plates by producing a pressure on one face of the transparency at the projection aperture with a pump. However, that device requires a separate pump and produces little air flow for cooling. Similarly, U.S. Pat. No. 3,182,548 discloses a projector in which pressure is produced against one face of the transparency by a fan which provides circulation of cooling air through the projector housing. However, since the fan must produce pressure in the housing the air exits formed in the housing must be restricted thereby limiting the cooling effect of the fan.

The projector of the present invention is constructed for use with a transparency mounted in the holder that supports the peripheral edges of the transparency and advantageously provides cooling of the projection lamp and lenses within the projector housing while at the same time locating the transparency during projection by directing a flow of air through a venturi with its throat between the projection aperture and a biconvex condensing lens in the projection system. This provides a large volume of cooling airflow through the projector while at the same time eliminating the warping of "heat popping" of the transparency during projection.

According to the present invention there is provided a projector for use with a transparency mounted on a holder that supports the peripheral edges of the transparency. The housing is generally tubular and is formed with an airflow passageway therethrough and a normally horizontal transparency support deck above the airflow passageway, which deck is formed with a projection aperture through which light is directed from within the housing to project the image contained on a transparency positioned over the projection aperture. A fan is supported within the housing and causes air to move through the airflow passageway, which air is directed by walls positioned in the airflow passageway through a venturi path with its throat between a first lens and the projection aperture to create a partial vacuum below the projection aperture when a transparency is over it to locate the transparency during projection thereof.

The novel features and advantages of the present invention will become apparent after reading the following description which refers to the drawing wherein.

Figure 1:
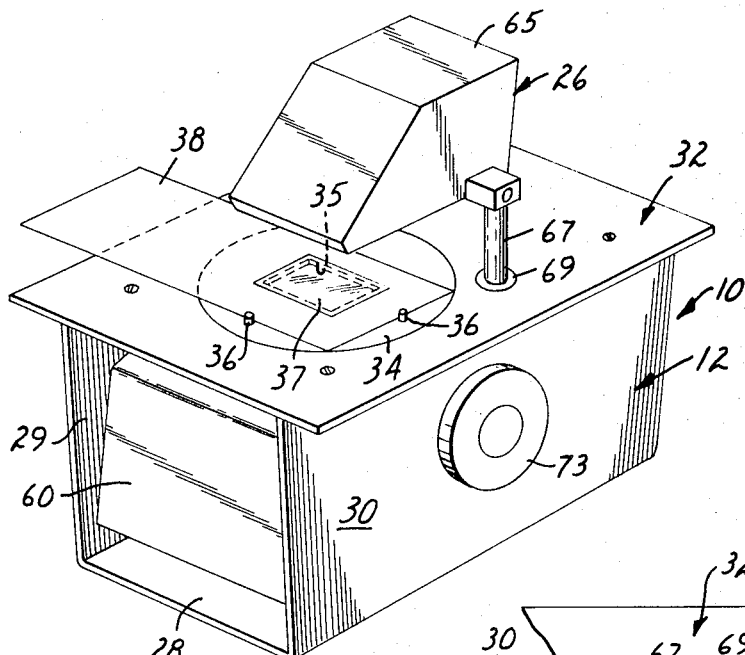
FIG. 1 is a perspective view of a transparency projector constructed in accordance with the present invention with a transparency in projection position thereon.
Figure 2:
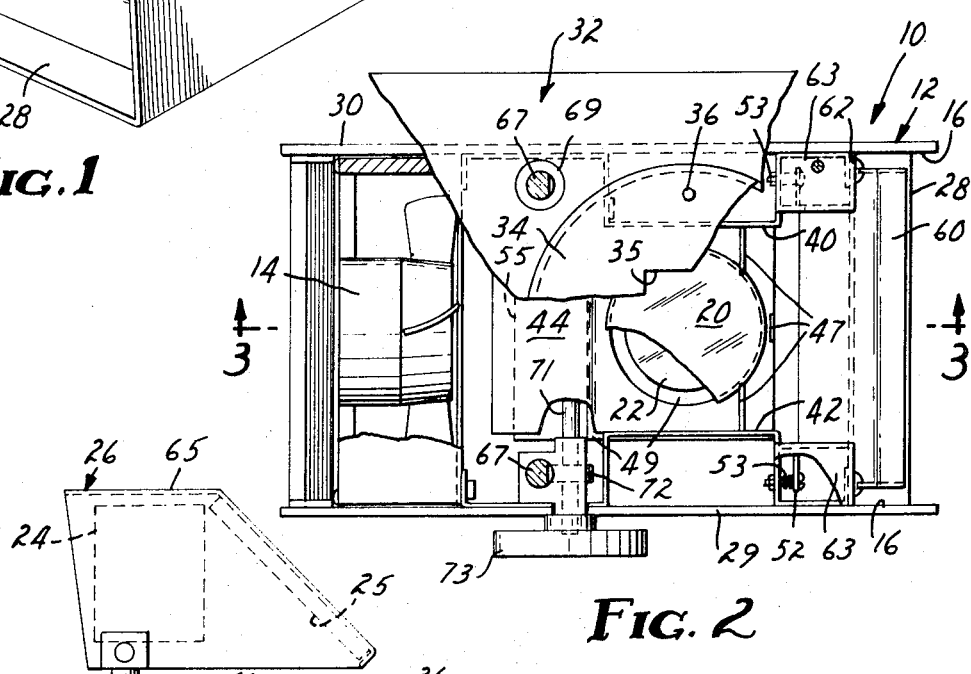
FIG. 2 is a top view of the projector partially sectioned to show the interior thereof.
Figure 3:
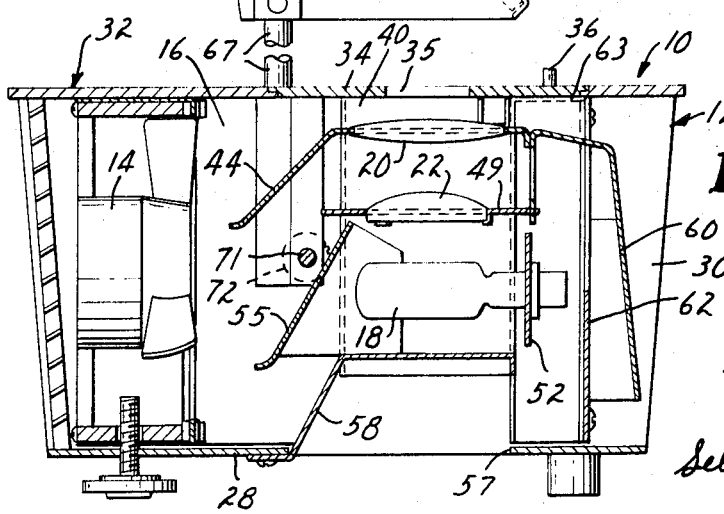
FIG. 3 is a longitudinal sectional view taken generally along line 3—3 of FIG. 2.

Referring now to the drawing there is illustrated a transparency projector made in accordance with the present invention and generally designated 10 comprising a generally tubular housing 12, a fan 14 supported within the housing 12 adjacent one end, walls 16 within the housing 12 for directing air flow therethrough, a lamp 18, and projection means including a first biconvex condensing lens 20 and a heat-absorbing meniscus condensing lens 22 supported within the housing and a second lens 24 and a mirror 25 supported in a movable lens carrier or head 26 positioned above the housing 12 for movement toward and away from the housing.

The housing 12 is defined by a base wall 28 and a pair of parallel sidewalls 29 and 30 formed from a single sheet of metal and an upper wall or transparency support deck 32 secured parallel to the base wall 28. The absence of end walls on the housing 12 provides a large cross-sectional area longitudinal airflow passageway through the housing 12. The transparency support deck 32 includes a rotatable disk 34 centrally of its width. The disk 34 is formed centrally with a rectangular aperture 35 of a size and shape similar to that of the image area of the transparency to be projected. In the illustrated embodiment the aperture is rectangular to permit projection of the images contained on a transparency 37 which is secured by its peripheral edges in a corresponding aperture in a thin cardboard card 38 on which may be inscribed information about the transparency. A pair of short pegs 36 extend from the rotatable disk 34 to aid in locating the transparency card 38 with the transparency 37 aligned with the projection aperture 35.

The electric fan 14 is supported in a suitable frame having generally the same cross-sectional dimensions as that of the airflow passageway through the housing 12. It is supported at one end of the airflow passageway to draw air through the airflow passageway from the opposite end of the housing 12.

The airflow directing walls 16 are supported within the airflow passageway through the housing 12 and support the lamp 18 the first lens 20 and the heat-absorbing lens 22 as well as directing the flow of air produced by the fan 14. The flow directing walls 16 include a pair of similar support walls 40 and 42 one extending along each of the housing side walls 29 and 30 and formed with a generally U-shaped portion extending into the airflow passageway in the area below the projection aperture 35. The U-shaped portions of the support walls 40 and 42 extend downward from the transparency support deck 32 and are terminated above the base wall 28. A first transverse flow directing wall is secured to and fills the space between the U-shaped portions of the support walls 40 and 42. This wall 44 is spaced from and lies generally parallel to the transparency support deck 32 between the U-shaped portions of the support walls 40 and 42 and it is turned downward toward the base wall 28 as it extends toward the fan 14. Centrally, the first flow directing wall 44 is formed with an aperture in which is supported the first lens 20 with its axis in vertical alignment with the center of the projection aperture 35. At the end of the first flow direction wall 44 farthest removed from the fan 14 there is secured a plate having three spaced upstanding projections 47, the outer two of which aid in holding the first lens 20 in place. These three projections 47 extend into the airflow path over the first lens 20 to create turbulence in airflow through this path thereby to aid in transferring heat from the lens 20 and the transparency 37 to the flowing air.

The heat-absorbing lens 22 is supported below the first lens 20 in axial alignment therewith by an appropriately apertured plate 49 which is supported in slots formed in the U-shaped portions of the support walls 40 and 42. The lamp 18 is supported below the heat-absorbing lens 22 with its axis horizontal. It is appropriately supported at its base in a vertical plate 52 that is supported on three spring loaded screws 53 secured to the support walls 40 and 42 and arranged in a triangle around the base of the lamp to provide adjustment in the position of the lamp 18.

A second transverse airflow directing wall 55 is secured by protruding flanges to the U-shaped portions of the support walls 40 and 42 to generally extend downward from the heat-absorbing lens support 49 toward the fan 14 below the lamp 18 to direct air flowing across the lamp 18 downward along the base 28 of the housing 12. The base wall 28 is formed with an air flow opening 57 below the lamp 18. A third transverse air flow directing wall 58 is secured to the base wall 28, extends upward from the base wall toward the lamp 18 and is formed with a planar portion extending below the lamp 18 between the U-shaped portions of the support walls 40 and 42. A rear transverse airflow directing wall 60 is secured to the support walls 40 and 42 at the end of the airflow passageway opposite the fan 14. It extends upward from a position spaced from the base wall 28 to a position below the transparency support deck 32; it then extends into the housing to mate with the first air flow directing wall 44 where it is turned downward to abut and locate the heat-absorbing lens support plate 49. The portion of the rear transverse wall 60 extending vertically between the first lens 20 and the heat-absorbing lens 22 is formed with a central aperture to permit airflow between the lenses. Adjacent the base wall 28 the rear airflow directing wall 60 is formed with flanges that extend into the housing and abut a vertical air flow directing and support wall 62 which extends between the base wall 28 and the transparency support deck 32. The vertical support wall 62 has portions removed between the transparency support deck 32 and the upper surface of the rear airflow directing wall 60 and it is formed with vertical tabs 63 abutting the transverse edges of the rear air flow directing wall 60 to form a closed air path from the rear of the housing over the first lens 20. The vertical wall 62 also has portions removed immediately below the rear airflow directing wall 60 to create an airflow path between these walls directing airflow between the first lens 20 and the heat-absorbing lens 22. With the airflow passageway through the housing the U-shaped portions of the support walls 40 and 42, the rear airflow directing wall 60, the transparency support deck 32, the first airflow directing wall 44 and first lens 20 define a venturi with its throat between the first lens 20 and the projection aperture 35. The fan 14 is chosen to provide sufficient cooling air for the lamp 18 as well as to provide sufficient air flow through the venturi to create a partial vacuum when a transparency 37 is supported over the aperture 35 to retain the transparency in projection position and to prevent the transparency 37 from "heat popping" during projection thereof.

The airflow directing walls 40, 42, 44, 55, 58, 60 and 62 are painted black to avoid reflection of light within the housing 12. The locations of these walls and their light absorbing color also shield the lamp 18, the first lens 20 and the heat-absorbing lens 22 to prevent light from radiating from the housing 12 through the airflow passageway.

The lens carrier 26 comprises a hood 65 supported by a pair of similar legs 67 that extend into the housing 12 parallel to the axes of the first lens and the heat-absorbing lens 22. Within the hood 65 the second lens 24 is supported with its axis perpendicular to and intersecting the axes of the first lens 20 and the heat-absorbing lens 22. The mirror 25 is supported in the carrier hood above the projection aperture 35 at a 45° angle to reflect images projected by the lamp 18, the first lens 20 and the heat-absorbing lens 22 through the second lens 24. The legs 67 of the lens carrier 26 extend into vertical apertures in nylon inserts 69 supported by the housing 12 and they are formed at their lower ends with gear teeth. The nylon inserts 69 rotatably support a shaft 71 that extends through the housing 12 and supports a hand wheel 73 at each end adjacent the sidewalls 29 and 30. A pair of similar gears 72 are secured to the shaft 71, which gears 72 mesh with the gear teeth formed on the lens carrier legs 67 to provide movement of the lens carrier 26 parallel to the axes of the first lens 20 and the heat-absorbing lens 22 upon rotation of either of the hand wheels 73.

In use, power is supplied to the lamp 18 and the electric fan 14 by turning on a switch (not shown). The fan 14 draws air through the airflow passageway and the flowing air is directed by the internal walls generally along three paths: the first extending over the rear airflow directing wall 60 and over the first lens 20, the second between the rear air flow directing wall 60 and the vertical support wall 62 and then between the first lens and the heat-absorbing lens to the fan, and the third through the opening 57 in the base wall 28 and around the lamp 18 and finally between the second and third transverse airflow directing walls 55 and 58. When a card 38 containing a transparency 37 is placed in position with the transparency over the projection aperture 35 the venturi is completed and a partial vacuum is created between the transparency and the first lens 20 tending to draw the transparency down into the projection aperture 35 to prevent "heat popping" of the transparency 37 during projection thereof. After the transparency 37 has been positioned one or the other of the hand wheels 73 is rotated to focus the projected image on an external surface. Once the projected image has been focused the partial vacuum in the venturi throat will keep it in focus and no further movement of the lens carrier will be required.

Having described the present invention

What is claimed is:

1. A projector for use with a transparency mounted in a holder that supports at least the peripheral edges of the transparency, comprising:

a housing formed with an airflow passageway therethrough and a generally horizontal transparency support deck above said airflow passageway formed with a projection aperture having a size and shape similar to that of the image area on a said transparency to be projected, a lamp supported within said housing, projection means supported by said housing to direct light from said lamp through said projection aperture and to focus the projected image of a said transparency, said projection means including a first lens supported within said housing in axial alignment with and spaced from said projection aperture, a fan supported within said housing to move air through said air flow passageway, and a fan supported within said housing to move air through said airflow passageway, a first wall means in said airflow passageway for directing flowing air over the surface of said lamp, and a second wall means in said airflow passageway for directing flowing air over said first lens and across said projection aperture said first lens being positioned in said second wall means and with said second wall means defining a venturi with its throat between said first lens and said projection aperture to create a partial vacuum below said projection aperture when a said transparency is over it, whereby to locate a said transparency during projection thereof.

2. A projector as recited in claim 1 wherein said projection means includes a lens carrier extending normally above said transparency support deck and supported by said housing for movement parallel to the axis of said first lens, a second lens supported by said lens carrier above said transparency support deck with its axis perpendicular to and intersecting the axis of said first lens and a reflector supported by said lens carrier to reflect light focused through a said transparency by said first lens through said second lens.

3. A projector as recited in claim 2 wherein said projection means further includes a heat-absorbing lens supported within said housing between said lamp and said first lens and wherein said wall means for directing flowing air further defines means directing moving air over the surfaces of said heat absorbing lens.

4. A projector as recited in claim 1 wherein said housing is defined by spaced generally parallel side walls joined to said transparency support deck and a base wall that is spaced from and generally parallel to said support deck to define said airflow passageway through said housing, wherein said fan is supported at one end of said housing and extends transversely of and generally fills said one end of said air flow passageway, and wherein said wall means directing flowing air extend generally transversely of said airflow passageway.

5. A projector as recited in claim 4 wherein said wall means directing flowing air further define means for shielding said lamp and said lens means within said housing to prevent light from radiating from said housing through said air flow passageway.

6. A projector as recited in claim 4 wherein said fan draws air through said passageway and along said wall means directing flowing air.

7. A projector as recited in claim 1 including a plurality of projections in said venturi to cause turbulent flow of air in said venturi throat to aid in cooling said first lens and a said transparency.

* * * * *